United States Patent Office 3,154,555
Patented Oct. 27, 1964

3,154,555
NEW DIAZACYANOMETHINE DYES
Johannes Dehnert, Ludwigshafen (Rhine), Germany, assignor to Badische Anilin- & Soda-Fabrik Aktiengesellschaft, Ludwigshafen (Rhine), Germany
No Drawing. Filed Nov. 28, 1961, Ser. No. 155,471
Claims priority, application Germany Nov. 30, 1960
5 Claims. (Cl. 260—294.8)

This invention relates to new dyes of the diazapolymethine series, more particularly new diazacyanomethine dyes, and methods for their production.

Diazapolymethine dyes which dye polyacrylonitrile fibers with good fastness are already known from the literature. There is however a demand for dyes which will give dyeings with better light fastness than the dyes already known.

The dyes according to this invention give dyeings with outstanding light fastness on polyacrylonitrile.

The invention relates to dyes of the general formula:

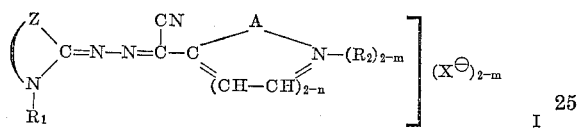

in which A and Z denote divalent radicals which are required to complete a five- or six-membered mononuclear or dinuclear heterocyclic system, $R_1$ denotes a hydrogen atom or an aliphatic, cycloaliphatic or araliphatic radical, $R_2$ denotes an aliphatic, cycloaliphatic or araliphatic radical, X denotes an anion, $m$ denotes one of the numbers 1 and 2 and $n$ denotes one of the numbers 1 and 2.

The invention relates especially to dyes of the Formula I in which:

denotes a radical of a heterocyclic compound substituted on the nitrogen atom by $R_1$ and having the skeleton of thiazole, benzothiazole, quinoline, 1,3,4-thiadiazole, 1,2,4-triazole, 1,3,4-oxadiazole, pyrazole, tetrazole, cinnoline, pyridazine or indazole, $R_1$ denotes hydrogen or a methyl, ethyl, chloroethyl, propyl, butyl, cyclohexyl or benzyl radical, $R_2$ denotes methyl, ethyl, chloroethyl, propyl, butyl, cyclohexyl or benzyl, A denotes a connecting member which completes the part of the formula:

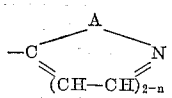

to 1-methyl-, 1-ethyl- and 1-phenylbenzimidazolyl-(2), 1-methyl-, 1-ethyl- and 1-phenyl-5-chlorobenzimidazolyl-(2), benzoxazolyl-(2), benzothiazolyl-(2), pyridyl-(2), pyridyl-(4), quinolyl-(2) and quinolyl-(4), X denotes a colorless anion, $m$ denotes one of the numbers 1 and 2 and $n$ denotes one of the numbers 1 and 2.

Dyes in which $m$ is equal to 1 are preferred.

The divalent radical Z may be, for example, one of the following connecting members, which may also be substituted:

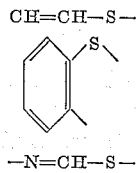

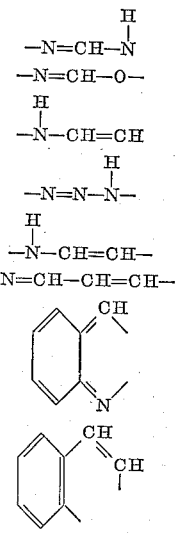

The following connection members A, which may also be substituted, are given by way of example:

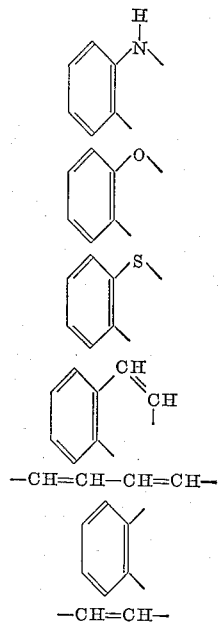

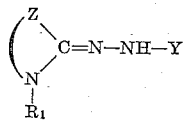

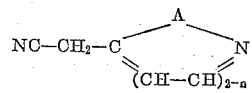

$n$ being equal to two except in the two last cases. The invention is not limited to the connecting members Z and A specified above.

The invention also relates to a process for the production of dyes of the said kind.

These dyes are obtained:

(a) By coupling hydrazones or their derivatives of the general formula $$\begin{pmatrix} Z \\ \diagdown \\ N \\ | \\ R_1 \end{pmatrix} C=N-NH-Y \qquad II$$

in which Z and $R_1$ have the meanings given above and Y denotes a hydrogen atom or an arylsulfonyl radical in the presence of dehydrogenation or oxidizing agents with compounds of the general formula:

$$NC-CH_2-C \overset{A}{\underset{(CH-CH)_{2-n}}{\diagup\diagdown}} N \qquad III$$

in which A and n have the meanings given above, and if desired treating the coupling products with alkylating agents, or (b) Diazotizing amines of the general formula:

IV in which Z has the meaning given above, coupling the resultant diazotized amines with compounds of the Formula III and if desired treating the coupling products with alkylating agents.

Examples of initial materials of the Formula II in which Y denotes hydrogen are: benzothiazolone-2-hydrazone, 3-methylbenzothiazolone-2-hydrazone, 6-methoxy-3-methylbenzothiazolone-2-hydrazone, 1-methylquinolone-2-hydrazone, 5 - methylmercapto - 3-methylthiadiazolone-2-hydrazone, 5-phenylamino-3-methylthiadiazolone-2-hydrazone and the equivalent compounds substituted on the nitrogen atom in 1 or 3 position of the heterocyclic ring by ethyl, propyl, butyl, cyclohexyl, benzyl or phenyl radicals.

Examples of hydrazones of the Formula II bearing arylsulfonyl groups, i.e. with Y equal to $SO_2Ar$, are: 3-methylbenzothiazolone - (2) - N'-benzenesulfonylhydrazone, and 3-methyl-6-methoxybenzothiazolone-(2)-N'-benzenesulfonylhydrazone.

Examples of initial materials of the Formula III are: 2-cyanomethylbenzimidazole, 2-cyanomethyl - 1 - phenylbenzimidazole, 2-cyanomethyl-5-chlorobenzimidazole, 2-cyanomethylbenzoxazole, 2-cyanomethylbenzothiazole, 2-cyanomethylpyridine, 4-cyanomethylpyridine, 2-cyanomethylquinoline, and 4-cyanomethylquinoline.

Many of these cyanomethyl compounds are known. Cyanomethyl compounds which have not been described may be obtained by methods analogous to those for the known substances; for example 2-cyanomethyl-5-chlorobenzimidazole is obtained by reaction of 4-chloro-1,2-diaminobenzene with cyanoacetic acid esters analogously to the method of preparation of 2-cyanomethylbenzimidazole from 1,2-diaminobenzene.

The coupling of initial materials of Formula II with compounds of Formula III is preferably effected at 0° to 30° C. in the presence of dehydrogenation or oxidizing agents, such as atmospheric oxygen, hydrogen peroxide. hypochlorite, persulfates, perborates, ferric salts, cupric salts, mercuric salts, ceric salts and hexacyanoferrates (III). Water, organic solvents or mixtures of both are suitable as reaction media.

The heterocyclic, diazotisable, preferably five-membered, amines of the said general Formula IV may contain condensed-on rings, for example benzene or naphthalene rings. Especially suitable diazo compounds are the diazotised amines of the heterocyclic compounds: thiazole, benzothiazole, thiadiazole, oxdiazole, pyrazole, triazole, tetrazole, cinnoline, pyridazine and indazole.

The heterocyclic compounds or the ring systems containing heterocyclic rings may be substituted by the conventional substituents for azo dyes, as for example alkyl, alkoxy, aralkyl, aryl, nitro, acyl, acylamino, alkylsulfonyl, sulfonic acid or carboxylic acid amide groups or halogen atoms.

The alkylation of the dyes obtainable by the methods (a) and (b) may be carried out without the use of solvents or in the presence of solvents or diluents, preferably at temperatures between 20° and 160° C., if desired with the addition of acid-binding agents, such as magnesium oxide, sodium methylate, or dimethyl formamide. Dimethyl sulfate, diethyl sulfate, the methyl, ethyl and chloroethyl esters of toluenesulfonic acid, methyl iodide, ethyl iodide, propyl chloride, butyl bromide and benzyl chloride, butyl bromide and benzyl chloride are examples of suitable alkylating agents. Dimethyl sulfate and diethyl sulfate are preferred. Dimethyl sulfate is especially suitable for alkylating the dyes.

By the methods (a) and (b) dyes are first obtained having the general formula:

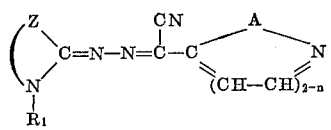
V in which $R_1$, Z, A and n have the meanings given above, from which dyes of the formally equivalent Formulae VI-A and VI-B are obtained by alkylation:

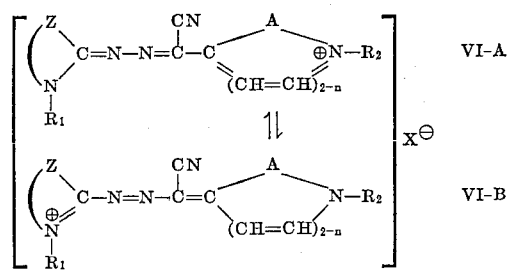

Formulae VI-A and VI-B are resonance formulae and for the sake of simplicity only the Formula VI-A will hereinafter be used. In the formulae VI, $R_1$ and $R_2$ denote alkyl radicals, preferably of low molecular weight, for example containing 1 to 4 carbon atoms, cycloalkyl radicals or aralkyl radicals, which may also be substituted, and X denotes an anion, especially of chloride, bromide, iodide, nitrate, perchlorate, sulfate, phosphate, tetrachlorozincate, tetrabromozincate, tetrafluoborate, toluenesulfonate, methosulfate or ethosulfate ion.

These anions are required to neutralize the cationic part of the dye. Their constitution is therefore not of decisive importance as regards the quality of the dye. For technical reasons, inorganic anions are preferred, mainly those derived from monobasic acids. The anions may also be inorganic complexes. Anions which have no colour of their own are especially important.

The dyes obtainable according to this invention are water-soluble to a greater or lesser extent depending on the nature of the components used. They are outstandingly suitable in soluton or suspension for dyeing and printing textiles, e.g. of mordanted cotton, leather, or such materials, as fibers, flock, threads, filaments, films or spun goods of cellulose esters or ethers or of synthetic substances, such as polyamides, polyurethanes or polyesters. Especially on products of polyacrylonitrile or products of copolymers containing acrylonitrile, the dyes according to this invention give dyeings and prints in pure and very fast shades.

The invention is illustrated by, but not limited to, the following examples in which parts, unless otherwise stated, are by weight. Parts by volume bear the same relation to parts by weight as the liter under standard conditions to the kilogram.

*Example 1*

A solution of 18 parts of 3-methylbenzothiazolone-2-hydrazone in 500 parts of 0.2M aqueous hydrochloric acid is united at room temperature with a suspension of 16 parts of 2-cyanomethylbenzimidazole in 250 parts of water and, with stirring and external cooling, 300 parts by volume of aqueous 2M ferric chloride solution and 250 parts by volume of 50% aqueous sodium acetate solution are allowed to flow in simultaneously but separately. The yellow precipitate formed is filtered off by suction, washed with water and dried. A yellow dye of the formula:

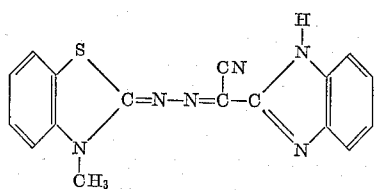

is obtained which dissolves in 80% aqueous acetone with a yellow color and dyes polyamide fibers yellow shades of very good fastness.

By using 21 parts of 6-methoxy-3-methylbenzothiazolone-2-hydrazone instead of 18 parts of 3-methylbenzothiazolone-2-hydrazone, a yellow coupling product with similar tinctorial properties is obtained.

Example 2

The dye obtained according to the first paragraph of Example 1 is heated with 100 parts by volume of chloroform to 50° to 60° C. 10 parts of magnesium oxide and 26 parts by volume of dimethyl sulfate are added and the whole is stirred at the said temperature until methylation is complete. This may be determined by paper chromatography. The chloroform is then distilled off and 3000 parts of 1% aqueous acetic acid is added at the same time. The methylated dye is precipitated as tetrachlorozincate by adding 20 parts by volume of 50% aqueous zinc chloride solution and 1000 parts by volume of saturated aqueous sodium chloride solution. The precipitate is filtered off by suction, washed with a small amount of water and dried at 70° C. A yellow dye of the formula:

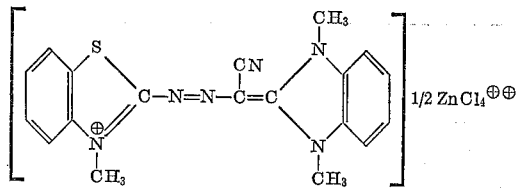

is obtained which dissolves in water with a yellow color and dyes polyacrylonitrile fabric yellow shades from an acetic acid or sulfuric acid bath. Dyeings thus obtained have outstanding wet and light fastness properties. An orange methylation product with similar properties is obtained by using 6-methoxy-3-methylbenzothiazolone-2-hydrazone as the hydrazone component.

Example 3

12 parts of 4-cyanomethylpyridine is added to a solution of 21 parts of 6-methoxy-3-methylbenzothiazolone-2-hydrazone in 400 parts of water and 40 parts by volume of concentrated hydrochloric acid, and then 300 parts by volume of a 2M aqueous ferric chloride solution is gradually added at room temperature. The dye obtained, which is difficultly soluble in the reaction solution, is filtered off by suction, washed with water and dried. A dye of the formula:

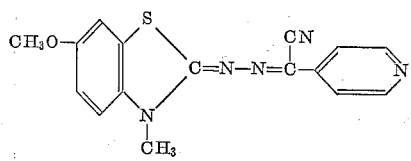

is obtained as a yellow-brown powder which dissolves in 80% aqueous acetone with a yellow color. The dye when finely dispersed in the dyebath dyes polycaprolactam fabric fast yellow shades.

By using 12 parts of 2-cyanomethylpyridine as coupling component, a yellow dye is obtained having similar tinctorial properties.

Example 4

The dye of Example 3, paragraph 1, is methylated and worked up as described in Example 2. An orange-red zinc chloride double salt of the formula:

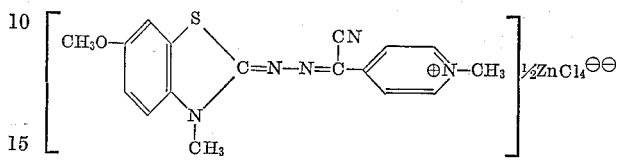

is obtained which dissolves in water with an orange color and dyes polyacrylonitrile filament outstandingly wet and light fast scarlet-red shades. The yellow methylation product of the dye of Example 3, paragraph 2, gives yellow shades with similar tinctorial properties.

Example 5

A mixture of 100 parts by volume of 1M aqueous potassium hexacyanoferrate (III) solution, 100 parts by volume of 2N aqueous caustic soda solution and 200 parts by volume of N-methylpyrrolidone is allowed to flow gradually at room temperature into a solution of 16 parts of 3 - methylbenzothiazolone-2-benzenesulfonylhydrazone and 6 parts of 2-cyanomethylpyridine in 200 parts by volume of N-methylpyrrolidone, 100 parts of water and 100 parts by volume of 2N aqueous caustic soda solution. The dye thus obtained is completely precipitated by adding 1000 parts of water and 50 parts by volume of 30% aqueous acetic acid. The precipitated dye is filtered off, washed with water and dried. The dye obtained has the formula:

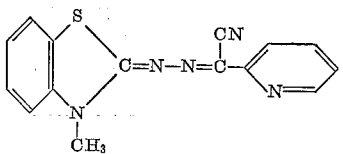

and is a yellow powder. It dissolves in 80% aqueous acetone with a yellow color. In finely dispersed form it dyes polyacrylonitrile fabric yellow shades of very good wet and light fastness from an acetic acid bath.

By using 8 parts of 2-cyanomethylbenzimidazole as coupling component, the same dye is obtained as in Example 1.

Example 6

The dye obtained according to Example 5, paragraph 1, is stirred at 50° to 60° C. with 250 parts by volume of chloroform and 6 parts by volume of dimethyl sulfate until methylation is complete. The chloroform is then removed by distillation and 2000 parts of water added at the same time. The product is completely deposited by the addition of 1500 parts by volume of saturated aqueous sodium chloride solution, filtered off and dried. The dye of the formula:

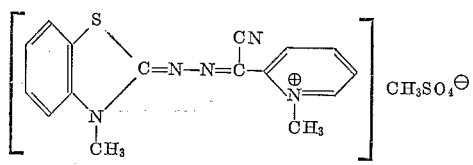

thus obtained is a yellow powder which dissolves in hot water with a yellow color and dyes cellulose 2½-acetate fast yellow shades.

Example 7

35 parts of a 40% solution of nitrosylsulfuric acid in concentrated usulfuric acid is allowed to flow at 0° to 5° C. into a solution of 15 parts of 1-aminobenzothiazole in 100 parts of 60% sulfuric acid and the mixture stirred for another three hours at this temperature.

The diazo solution is then gradually introduced into a suspension of 16 parts of 2-cyanomethylbenzimidazole in 500 parts of water and 500 parts of ice at 0° to 5° C. The water-insoluble azo dye thus formed is filtered off by suction and washed free from acid. After drying, a dye of the formula:

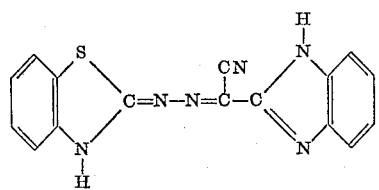

is obtained as a yellow powder which dissolves in dimethylformamide with a yellow color and dyes polyamide fabric fast yellow shades.

Example 8

The entire amount of dry dye obtained according to Example 7 is heated to 60° C. with 1000 parts by volume of chloroform. 5 parts of magnesium oxide and 35 parts by volume of dimethyl sulfate is added and the mixture stirred at 60° C. until methylation is complete. This can readily be determined for example by paper chromatography. 3000 parts by volume of 0.5% aqueous acetic acid is then allowed to flow into the reaction mixture and chloroform distilled off at the same rate. The product is filtered while still hot and 1000 parts by volume of a saturated aqueous sodium chloride solution is slowly added to the hot filtrate. After cooling, the product is filtered off by suction, washed with a small amount of water and dried. An orange dye of the formula:

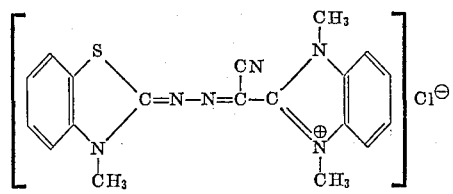

is obtained in the form of a powder which dissolves in hot water with a yellow color and dyes polyacrylonitrile fibers yellow shades of outstanding light and wet fastness from an acetic acid or sulfuric acid bath.

The following dyes are obtained in an analogous manner:

| Example | | Shade of dyeing on polyacrylonitrile |
|---|---|---|
| 9 | [structure with CH₃SO₄⁻] | Yellow. |
| 10 | [structure with Br⁻] | Orange. |
| 11 | [structure with ClO₄⁻] | Scarlet. |
| 12 | [structure with BF₄⁻] | Orange. |
| 13 | [structure with CH₃-C₆H₄-SO₃⁻] | Yellow. |

Example 14

35 parts of a 40% solution of nitrosylsulfuric acid in concentrated sulfuric acid is added at 0° to 5° C. to a solution of 15 parts of the nitrate of 2-amino-5-phenyl-1,3,4-thiadiazole in 200 parts of concentrated sulfuric acid and 80 parts of water and after three hours the diazotization mixture is introduced at 0° to 5° C. into a suspension of 16 parts of 2-cyanomethylbenzimidazole in 500 parts of water and 500 parts of ice.

When coupling is complete, the product is filtered off by suction, washed well and dried. A dye of the formula:

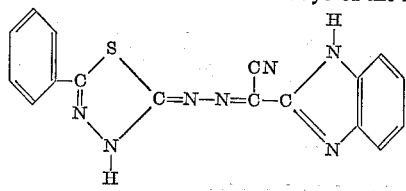

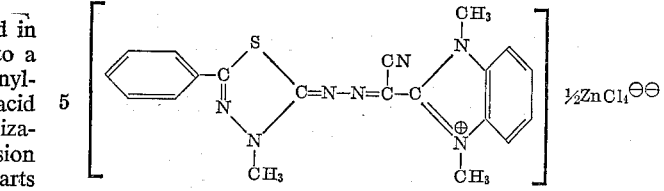

is obtained as a yellow ochre-colored powder which dissolves in hot water with a yellow color and dyes polyacrylonitrile flock yellow shades of outstanding fastness.

By using 2-amino-5-phenylthiadiazole and 3-amino-5-phenyl-1,2,4-triazole as diazo components and 2-cyanomethylpyridine, 4-cyanomethylpyridine or 2-cyanomethylbenzimidazole as coupling components and, if desired, diethyl sulfate as alkylating agent, the following dyes are obtained in the same way:

| Example | Dye | Shade of dyeing on polyacrylonitrile |
|---|---|---|
| 16 | ![structure] | Yellow. |
| 17 | ![structure] | Orange. |
| 18 | ![structure] | Yellow. |
| 19 | ![structure] | Yellow. | is obtained in the form of a brown-yellow powder which dissolves in dimethylformamide with a yellow color and dyes polyamide fiber fast yellow.

Example 15

The entire amount of dye obtained according to Example 14 is stirred at 60° C. with 500 parts of chloroform, 5 parts of magnesium oxide and 25 parts of dimethyl sulfate until initial dye can no longer be detected. The chloroform is then distilled off, while at the same time 3000 parts of water and 50 parts of 30% aqueous acetic acid are added. After filtering the aqueous solution, the dye is precipitated by adding 25 parts by volume of 50% aqueous zinc chloride solution and 1000 parts by volume of a saturated aqueous sodium chloride solution. The product is filtered off by suction and washed with dilute aqueous sodium chloride solution. After drying, the dye of the formula:

Example 20

A fabric of polyacrylonitrile staple fiber is introduced at 60° C. into a dyebath containing in 4000 parts of water 2 parts of 96% sulfuric acid, 20 parts of Glauber's salt and 0.6 part of the dye obtained according to Example 2 and the temperature is raised to 85° C. within fifteen minutes. The bath is brought to the boil in the course of another thirty minutes and dyeing is continued in the boiling bath for ninety minutes. The fabric is then soaped, rinsed and dried. The dyeing thus obtained has a very pure yellow shade and has outstanding light and wet fastness.

Example 21

100 parts of fibers of a copolymer derived from 40 parts of acrylonitrile and 60 parts of vinyl chloride is dyed at 85° C. in a dyebath containing in 3000 parts of water 5 parts of 30% acetic acid, 3 parts of the condensation product of 1 mole of sperm oil alcohol and 24 moles of ethylene oxide and 0.4 part of the dye obtained in Example 15. The fibrous material is dyed a pure yellow. The dyeing has outstanding light and wet fastness.

*Example 22*

100 parts of a fabric of cellulose 2½-acetate is dyed for sixty minutes at 80° C. in a bath of 3000 parts of water, 1.5 parts of the coupling product of Example 1 and 3 parts of the reaction product of 1 mole of castor oil and 40 moles of ethylene oxide. The dyeing obtained has a brilliant greenish-yellow shade and outstanding light and wet fastness.

I claim:
1. A dye of the formula:

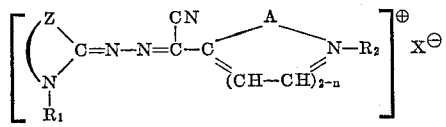

in which
$R_1$ and $R_2$ represent a radical selected from the class consisting of methyl and ethyl,
the moiety

represents a radical selected from the class consisting of benzothiazolinylidene-(2), 6 - methoxybenzothiazolinylidene - (2), thiazolinylidene - (2), 5-phenyl-1,3,4-thiodiazolinylidene - (2), and 5-phenyl-1,2,4-triazolinylidene-(3);
the moiety

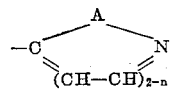

represents a radical selected from the class consisting of 1 - methylbenzimidazolyl - (2), 1 - ethylbenzimidazolyl - (2), pyridyl - (4) and pyridyl - (2), $n$ being an integer of 1 to 2; and
X represents an anion selected from the class consisting of $Cl^\ominus$, $Br^\ominus$, ½ $ZnCl_4^{\ominus\ominus}$, $CH_3SO_4^\ominus$, $C_2H_5SO_4^\ominus$, $BF_4^\ominus$, $ClO_4^\ominus$ and

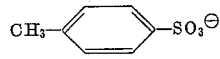

2. The dye of the formula:

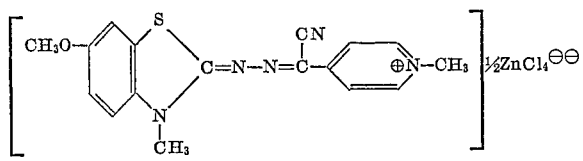

3. The dye of the formula:

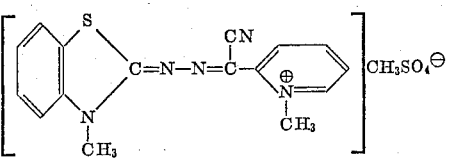

4. The dye of the formula:

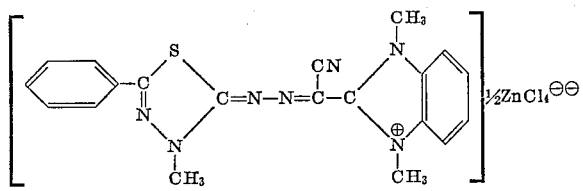

5. The dye of the formula:

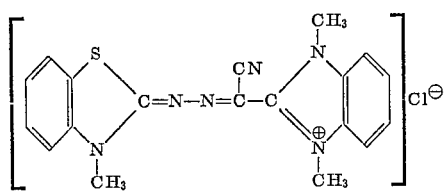

References Cited in the file of this patent
UNITED STATES PATENTS

| | | |
|---|---|---|
| 2,393,743 | Brooker et al. | Jan. 29, 1946 |
| 2,849,449 | Cope et al. | Aug. 26, 1958 |
| 2,872,449 | Baumann et al. | Feb. 3, 1959 |
| 2,913,303 | Baumann et al. | Nov. 17, 1959 |
| 2,918,369 | Doorenbos | Dec. 22, 1959 |
| 2,953,561 | Doorenbos | Sept. 20, 1960 |

FOREIGN PATENTS

| | | |
|---|---|---|
| 1,224,339 | France | Feb. 8, 1960 |
| 1,227,962 | France | Mar. 7, 1960 |
| 1,060,528 | Germany | July 2, 1959 |

OTHER REFERENCES

Fisher et al.: J. Chem. Soc., 1937, pages 907–911.
Chemical Abstracts, vol. 33, cols. 1738–1740 (1939) (abstracts of Borsche et al., Ann. vol. 537, pages 39 to 66 (1938).
Fuchs et al.: Ber. Deut. Chem., vol. 61, pages 57 to 65 (1928).